UNITED STATES PATENT OFFICE.

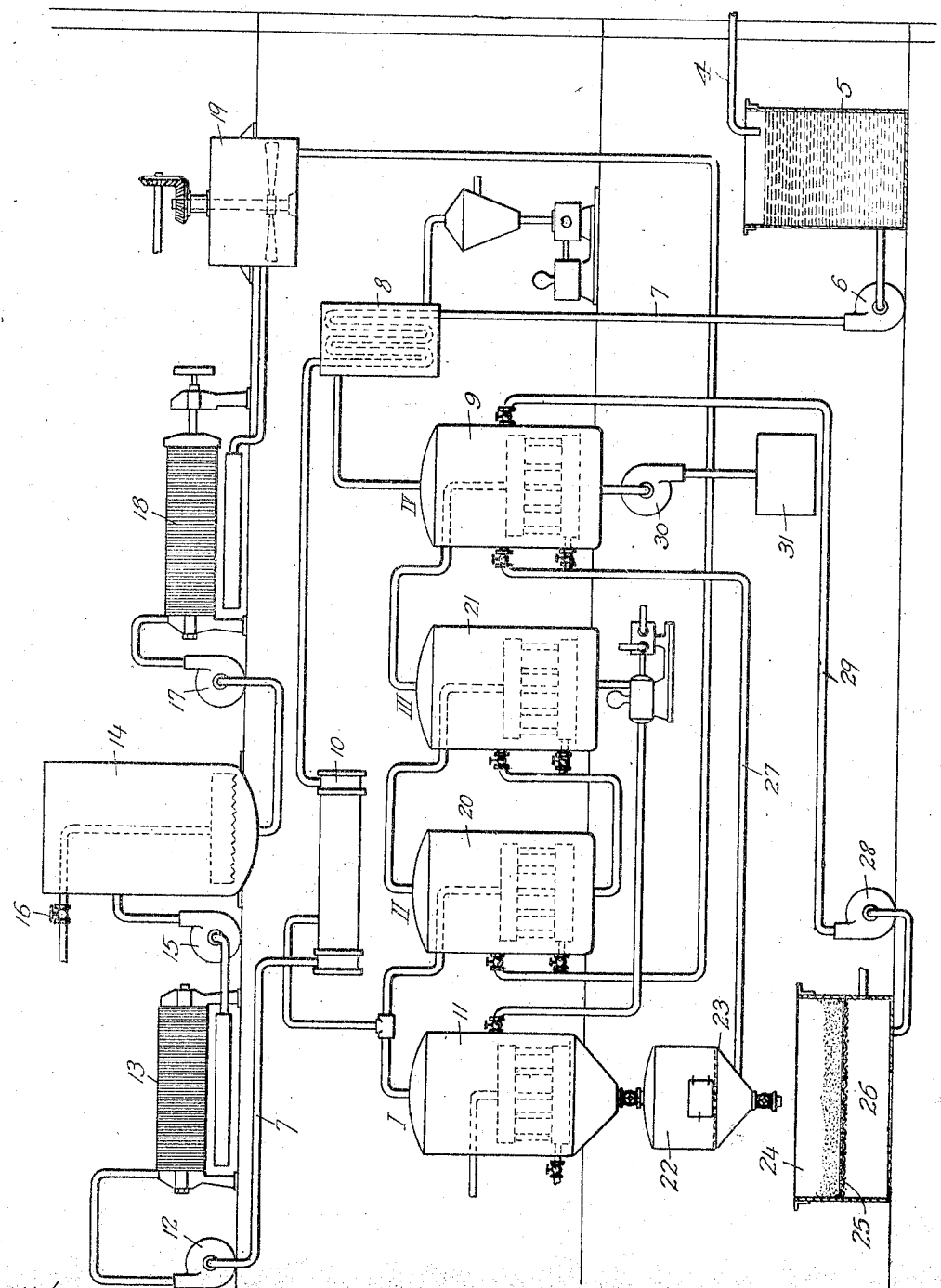

MARTIN J. KERMER, OF EVANSTON, ILLINOIS, AND HENRY A. FABER, OF CINCINNATI, OHIO.

METHOD OF RECLAIMING POTASSIUM SALTS, &c., FROM SUGAR REFUSE.

1,303,916.     Specification of Letters Patent.     Patented May 20, 1919.

Application filed March 15, 1918. Serial No. 222,558.

*To all whom it may concern:*

Be it known that we, MARTIN J. KERMER and HENRY A. FABER, respectively a citizen of the United States and a subject of the Queen of Holland, respectively residing at Evanston, in the county of Cook and State of Illinois, and at Cincinnati, county of Hamilton, and State of Ohio, have invented certain new and useful Improvements in Methods of Reclaiming Potassium Salts, &c., from Sugar Refuse, of which the following is a specification.

Our invention relates to a new and useful process for reclaiming valuable contents, such as potassium salts and nitrates, from waste water or liquid tailings resulting from the Steffens' process in sugar refining mills.

In the drawings we have shown a schematic arrangement of containers, evaporators, concentrators, mixers, filters and other suitable instrumentalities, in consecutive order, for carrying our invention into effect.

In refining sugar, by the well known Steffens' process, the waste water or liquid tailings, the contents of which are actually valuable by-products, is usually carried away into the sewer or other conduit and disregarded. This water carries in solution large quantities of potassium and nitrogenous materials which we reclaim by our process.

In carrying our invention into effect, we, briefly, change the sugar contents, the organic potassium compound and potassium carbonate, of the waste water into sulfates and change the organic nitrates into sulfates.

These chemical constituents are held in chemical solution in potassium sludge and the nitrogenous mother liquor, from which we separate the respective salts. We concentrate the liquor to precipitate the potassium salts and subsequently we concentrate the material containing the nitrates.

More specifically the waste water is first heated to approximately 185 degrees Fah., forming that which is commonly known as hot saccharate. It is then filtered, to remove all matter carried in mechanical suspension, after which the filtered liquor is thoroughly washed in carbon dioxid gas until its alkalinity is reduced to approximately .1—that is to say, 1/10 of a gram of CaO to 100 cubic centimeters of water. It is then, preferably, filtered again. The resultant clear liquid is then led to a mixing container and sulfuric acid is added and the liquids agitated. In practice we have found that about two-tenths of one per cent. by weight of sulfuric acid produces very satisfactory results when well mixed with the menstruum.

The effect of the sulfuric acid is to invert all of the sugar and change the non-sugars and the organic potassium compounds and potassium carbonate into sulfates. It also changes practically all of the organic nitrates into sulfates. The mother liquor is then evaporated until potassium sulfates are precipitated, whereupon it is subjected to further evaporation and concentration, and the resultant solid matter, which contains the nitrates, may then be dried, if desired.

In the drawing we have shown the apparatus located on three floors of a building, the first floor 1, the second floor 2, and the third floor 3.

The Steffens' waste water as it comes from the mill is discharged from the pipe 4 into the tank or reservoir 5. From this tank, it is pumped by the centrifugal pump 6 through the pipe 7 to the first heater 8.

Conveniently, the steam from the fourth effect evaporator 9 may be utilized in this heater. This does not heat the water to a sufficiently high temperature. Therefore, it is again heated to a higher degree in the second heater 10. Some of the steam from the first effect evaporator 11 is utilized in this second heater, wherein the water is raised to about 185 degrees Fah. forming that which is known as hot saccharate. From this heater it is carried by the centrifugal pump 12 through the pipe 7 and discharged into the plate and frame filter press 13. The clarified liquor is then pumped into the carbonation tank 14 by the pump 15. In this tank carbon dioxid gas is introduced through the pipe 16 and pumped through the liquor until its alkalinity is approximately .1. It is then moved by the pump 17 through the plate and frame press filter 18. This removes all of the mechanically carried matter, such as precipitated lime, or the like. From this filter it is discharged into mechanical mixer 19, where sulfuric acid is added. We have found that two-tenths of one per cent. in weight produces very satisfactory results. The effect of the sulfuric acid is to invert all of the sugar content, change the non-sugars, organic potash and potassium carbonate and the organic nitrogen into sulfates.

After the acid has been thoroughly mixed and incorporated with the liquor, it is introduced into the second effect evaporator 20 of a quadruple effect evaporator. From this effect it is drawn over to the third effect 21 and from the third effect it is pumped to the first effect 11 where high pressure steam is used. In this effect the liquor is concentrated to not less than 30 Brix, and when that density is reached, the potassium is precipitated as potassium sulfate in the salt basket 22, which has a perforated bottom 23 that is covered with a relatively fine screen to prevent the crystals which are formed in the first effect, from falling through.

The mother liquor, which penetrates and passes through the salt collected in the basket, and also through the screen of the basket is sucked over to the fourth effect 9 and is therein further concentrated from approximately 27° to 50° Brix. When the basket 22 is filled with salt, it may be removed through the door shown in a side wall of the basket.

The potassium salt, taken from the basket, is placed in the salt box 24. This box has a false perforate bottom 25 covered with a very fine screen and reticulate fabric, such as burlap, upon which the potassium salts, taken from the salt basket, is deposited. Attenuation, or sub-atmospheric pressure is produced in the lower chamber 26 of the box and thereby much of the mother liquor, which adheres to the potassium salts is removed. By leaving the salts in the box for an hour or two, most of the mother liquor may be extracted.

The salts are then subjected to the drying effect of an ordinary open type direct heat drier where the final moisture is removed, whereupon it may be then bagged, ready for shipment.

The mother liquor, which has been collected in the lower chamber of the salt basket 22 is constantly drawn over to the fourth effect evaporator, through the pipe line 27. There is also some liquid collected in the vacuum chamber 26 of the salt box 24. This liquid is drawn off by the pump 28 and forced through pipe 29 to the fourth effect evaporator.

The mother liquor is now concentrated to about 50° Brix and is pumped from the fourth effect evaporator by the pump 30 to the reservoir 31. From this reservoir it is taken and could be placed on the market as a commercial product.

Having described our invention, what we claim is:—

1. The process of reclaiming salts of potassium and nitrogen, from the waste water from Steffens' process of refining sugar, which consists in subjecting said water to the effect of sulfuric acid to invert the sugar content and to change the organic and carbonic constituents into sulfates; concentrating the liquor to precipitate the potassium sulfate, then concentrating the residue to obtain the nitrates.

2. The process of reclaiming salts of potassium and salts of nitrogen from the waste water from Steffens' process of refining sugar, which consists in mixing in said water less than one per cent. of sulfuric acid, by weight, to invert the sugar content and to change the organic constituents into sulfates; concentrating the liquor to precipitate the potassic salts, then further concentrating the residue to obtain the nitrates.

3. The process of reclaiming the salts of potassium and the salts of nitrogen, from waste water from Steffens' process of refining sugar, which consists in heating the water to obtain a hot saccharate; subjecting this liquor to the effect of carbon dioxid gas to reduce its alkalinity and to precipitate the lime; mixing said liquor with sulfuric acid, to invert the sugar content and to convert the organic constituents into sulfates; concentrating the liquid to precipitate the potassium salts and subsequently evaporating the residue to obtain the nitrates.

4. The process of separating the salts of potash and of nitrogen from the waste water resulting from Steffens' process, which consists in heating the liquid to a temperature necessary to produce hot saccharate; blowing carbon dioxid gas through the saccharate to reduce its alkalinity and precipitate the lime; filtering the liquor to remove the matter carried in mechanical suspension; mixing sulfuric acid with the liquor to convert the organic constituents and carbonates thereof into sulfates; then concentrating the residue by evaporation until the potassium content is precipitated; then concentrating the remaining liquor by evaporation to obtain the nitrogenous content.

5. The process of separating potassic and nitrogenous salts contained in the waste water resulting from Steffens' sugar milling process, which consists in subjecting said liquor to the effect of sulfuric acid to invert the sugar and change the non-sugar contents, the organic potash and potassium carbonate to sulfates and to change the organic nitrates into sulfates, then precipitating the potassium salts by evaporation, then concentrating the residue containing the nitrogen.

In testimony whereof we hereunto set our hands.

MARTIN J. KERMER.
HENRY A. FABER.